(12) United States Patent
Niehoff

(10) Patent No.: US 10,483,750 B2
(45) Date of Patent: Nov. 19, 2019

(54) SELECTIVE CIRCUIT BREAKER

(71) Applicant: EATON INDUSTRIES (NETHERLANDS) B.V., Hengelo (NL)

(72) Inventor: Ronaldus Niehoff, Oldenzaal (NL)

(73) Assignee: EATON INTELLIGENT POWER LIMITED, Dublin (IE)

( * ) Notice: Subject to any disclaimer, the term of this patent is extended or adjusted under 35 U.S.C. 154(b) by 409 days.

(21) Appl. No.: 15/320,755

(22) PCT Filed: Jun. 18, 2015

(86) PCT No.: PCT/EP2015/063753
§ 371 (c)(1),
(2) Date: Dec. 21, 2016

(87) PCT Pub. No.: WO2015/197471
PCT Pub. Date: Dec. 30, 2015

(65) Prior Publication Data
US 2017/0163023 A1 Jun. 8, 2017

(30) Foreign Application Priority Data
Jun. 24, 2014 (GB) .................................. 1411219.7

(51) Int. Cl.
*H02H 3/08* (2006.01)
*H02H 7/26* (2006.01)
(Continued)

(52) U.S. Cl.
CPC .............. *H02H 3/08* (2013.01); *H02H 3/027* (2013.01); *H02H 3/06* (2013.01); *H02H 7/261* (2013.01);
(Continued)

(58) Field of Classification Search
USPC ............................................ 361/2–13, 62–69
See application file for complete search history.

(56) References Cited

U.S. PATENT DOCUMENTS 9,331,470 B1 * 5/2016 Flegel ...................... H02H 3/33
2004/0027734 A1 * 2/2004 Fairfax .................. H01H 9/542
361/2

(Continued)

FOREIGN PATENT DOCUMENTS

CN 101212137 A 7/2008
CN 102904223 A 1/2013
(Continued)

*Primary Examiner* — Danny Nguyen
(74) *Attorney, Agent, or Firm* — Leydig, Voit & Mayer, Ltd.

(57) ABSTRACT

A selective circuit breaker, in operation connectable between a main supply line and a downstream circuit breaker, has a bypass switch in a supply line, and a controlled semiconductor switch connected in parallel to the bypass switch. A bypass switch off detection circuitry and a short circuit detection circuitry are provided for controlling the bypass switch and the semiconductor switch in accordance with a switching characteristic. The switching characteristic of the selective circuit breaker is programmable, and a short circuit current rating of the selective circuit breaker is substantially equal to a short circuit current rating of the downstream circuit breaker.

17 Claims, 4 Drawing Sheets

(51) Int. Cl.
*H02H 7/30* (2006.01)
*H02H 3/027* (2006.01)
*H02H 3/06* (2006.01)
H02H 3/00 (2006.01)
H02H 3/033 (2006.01)

(52) U.S. Cl.
CPC ............... *H02H 7/30* (2013.01); *H02H 3/006* (2013.01); *H02H 3/033* (2013.01)

(56) References Cited

U.S. PATENT DOCUMENTS

| | | |
|---|---|---|
| 2008/0106838 A1 | 5/2008 | Sirivella et al. |
| 2008/0158752 A1 | 7/2008 | Hill, Jr. et al. |
| 2012/0014026 A1 | 1/2012 | Narel et al. |
| 2013/0027829 A1 | 1/2013 | Antoniazzi et al. |
| 2013/0264883 A1* | 10/2013 | Bhavaraju ............... H02J 3/383 307/80 |
| 2014/0078622 A1* | 3/2014 | Crane .................... H02H 3/087 361/8 |
| 2014/0078628 A1 | 3/2014 | Valdes et al. |

FOREIGN PATENT DOCUMENTS

| | | |
|---|---|---|
| EP | 2110919 A2 | 10/2009 |
| EP | 2320535 A1 | 5/2011 |
| EP | 2408080 A2 | 1/2012 |
| WO | WO 2006108860 A1 | 10/2006 |
| WO | WO 2011018113 A1 | 2/2011 |
| WO | WO 2011116832 A1 | 9/2011 |

* cited by examiner

SELECTIVE CIRCUIT BREAKER

CROSS-REFERENCE TO RELATED APPLICATIONS

This application is a U.S. national stage application under 35 U.S.C. § 371 of International Application No. PCT/EP2015/063753, filed on Jun. 18, 2015, and claims benefit to British Patent Application No. 1 411 219.7, filed on Jun. 24, 2014. The International Application was published in English on Dec. 30, 2015, as WO 2015/197471 A1 under PCT Article 21(2).

FIELD

The present invention relates to a selective circuit breaker, in operation connectable between a main supply line and a downstream circuit breaker (or branch device).

BACKGROUND

European patent publication EP-A-2 320 535 discloses a current limiting circuit breaker including a short circuit functionality, which recloses after a set period of time after a first short circuit detection. If the short circuit fault is then again detected, a control unit is used to open the electrical circuit using a disconnector. A method for limiting current circulating in an electric circuit between an incoming line of an upstream circuit breaker and an outgoing line equipped with a downstream circuit breaker and/or divisional contactor is also disclosed.

SUMMARY

An aspect of the invention provides a selective circuit breaker, in operation connectable between a main supply line and a downstream circuit breaker, the selective circuit breaker comprising: a bypass switch in a supply line; a controlled semiconductor switch connected in parallel to the bypass switch; a bypass switch off detection circuitry; and a short circuit detection circuitry configured to control the bypass switch and the controlled semiconductor switch in accordance with a switching characteristic, wherein the switching characteristic is programmable, and wherein a short circuit current rating of the selective circuit breaker is substantially equal to a short circuit current rating of the downstream circuit breaker.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

The present invention relates to a selective circuit breaker, in operation connectable between a main supply line and a downstream circuit breaker (or branch device), the selective circuit breaker comprising a bypass switch in a supply line, and a controlled semiconductor switch connected in parallel to the bypass switch, a bypass switch off detection circuitry and a short circuit detection circuitry for controlling the bypass switch and the semiconductor switch in accordance with a switching characteristic.

The present invention provides an improved implementation of an automatic circuit breaker having a short circuit and overcurrent protection function.

According to the present invention, a selective circuit breaker is provided, wherein the switching characteristic of the selective circuit breaker is programmable (e.g. depending on the possible/actual behavior of the downstream circuit breaker), and wherein a short circuit current rating of the selective circuit breaker is substantially equal to a short circuit current rating of the downstream circuit breaker. This allows to use more cost-effective circuit breaker designs as selective circuit breaker, with power, current and switch off characteristics similar to that of the downstream circuit breaker. An optimized protection (very low let-through energy/$I^2t$) of wiring between selective circuit breaker and downstream circuit breaker with very small difference of $I^2t$ between selective and downstream circuit breaker is made possible. Further embodiments and associated advantages are described in the dependent claims, and further illustrated in detail in the following detailed description of embodiments of the present invention.

In electrical installations, miniature circuit breakers (MCB) are used as safety devices. Molded Case Circuit Breakers (MCCB) have a similar functionality, and are applied in higher power applications. In other applications also residual current devices (RCD) are used. The present invention embodiments of a selective circuit breaker relate to both of these classes of commercially available devices, and specifically the mode of operation thereof.

Figure 1:
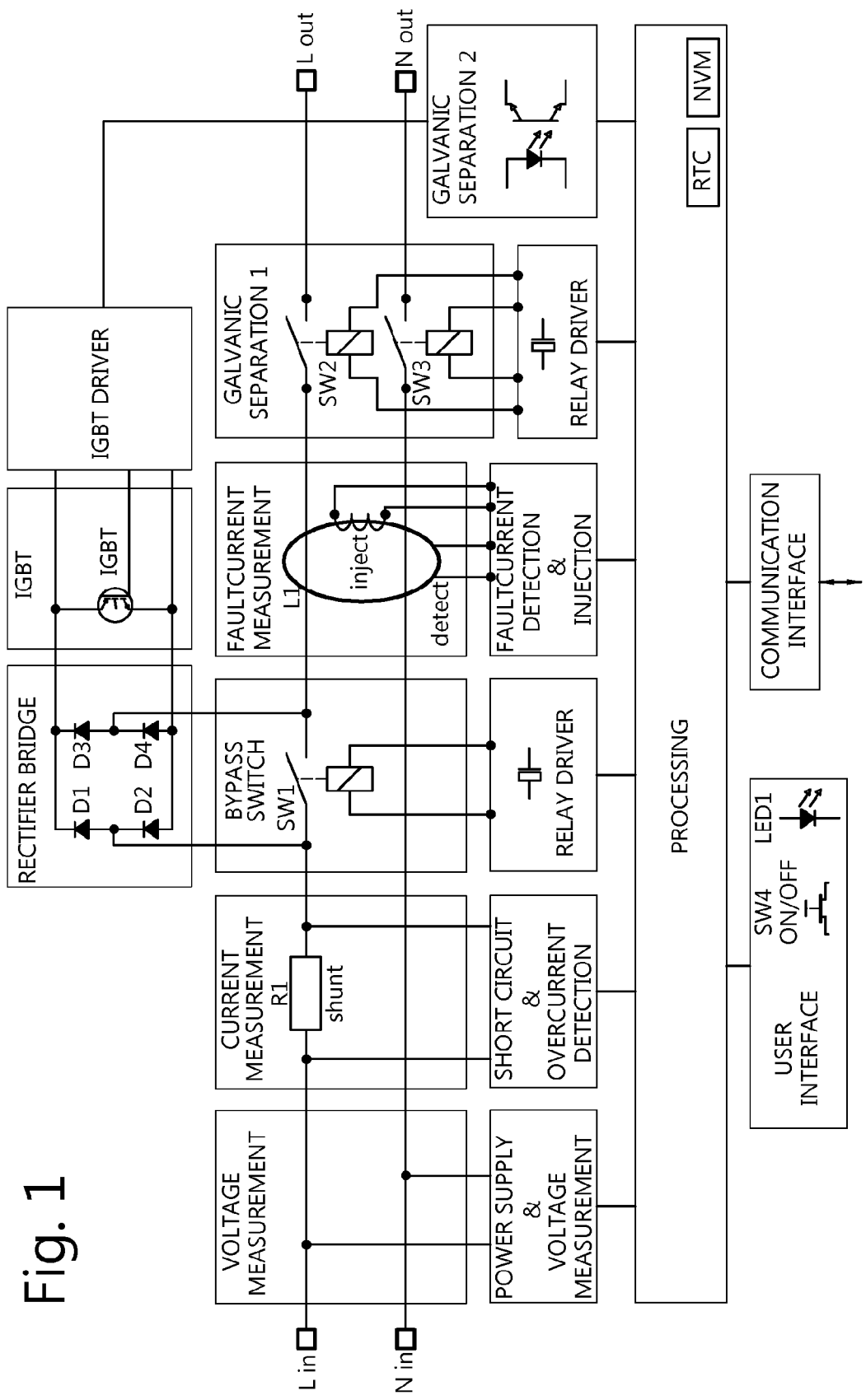
FIG. 1 shows a schematic view of a circuit breaker as applied in the present invention embodiments.

In FIG. 1 a block diagram is shown of an embodiment of a circuit breaker as used in the present invention embodiments. The (alternating current) circuit breaker comprises a live line between a live supply connecting terminal Lin and a live load connecting terminal Lout, and a neutral line between a neutral supply connecting terminal Nth and a neutral load connecting terminal Nout for connecting an (AC and/or DC) load to a mains supply (AC). The circuit breaker comprises a first galvanic separation switch SW2 and a bypass switch SW1 in the live line, a second galvanic separation switch SW3 in the neutral line, a semiconductor switch element IGBT connected parallel to the bypass switch SW1, and a processing unit arranged to control the first and second galvanic separation switch SW2, SW3, the bypass switch SW1 and the semiconductor switch element IGBT. The alternating current circuit breaker further comprises a power supply unit (part of the block Power Supply & Voltage Measurement in FIG. 1) connected to the live supply connecting terminal (Lin) and to the neutral supply connecting terminal (Nth), and connected to the processing unit and further components of the alternating current circuit breaker for providing electrical operating power thereto.

The (alternating current) circuit breaker may further comprising a short circuit and overcurrent detection unit connected to the processing unit for determining a short circuit situation or overcurrent situation (e.g. using the shunt resistor R1 in the live line in the block labeled Current Measurement in FIG. 1, which is connected to the block Fault Current Detection & Injection). The processing unit is further arranged for tripping the alternating current circuit breaker by opening the bypass switch SW1 and semiconductor switch element IGBT after determination of a short circuit or overcurrent situation, and to execute a reclosing attempt after a predetermined time period after tripping of the circuit breaker, wherein the predetermined time period is dependent (e.g. programmable) on the type of situation causing the tripping of the circuit breaker.

In a further group of embodiments, the alternating current circuit breaker further comprises a fault current detection and injection unit connected to the processing unit for determining a fault current situation, the fault current detection and injection unit being in galvanic separation to the live line and neutral line (e.g. using the coil L1 and transformer as indicated in the block Fault Current Measurement in FIG. 1). The processing unit is further arranged to trip the alternating current circuit breaker after determination of a fault current situation.

In the embodiment shown in FIG. 1, the semiconductor switch element comprises a combination of a rectifier bridge D1-D4 and an isolated gate bipolar transistor IGBT. Alternating current terminals of the rectifier bridge D1-D4 are connected in parallel to the bypass switch SW1, and direct current terminals of the rectifier bridge D1-D4 are connected to an emitter and a collector terminal of the isolated gate bipolar transistor IGBT. The processing unit is connected to a current measurement unit arranged in the live line, and is arranged to control the bypass switch SW1, first and second galvanic separation switches SW2, SW3 and the conducting state of the isolated gate bipolar transistor IGBT in case of detection of a short circuit and/or overload condition. The control of opening and closing the bypass switch SW1 and first and second galvanic separation switches SW2, SW3 by the processing unit is implemented using respective relay drivers connected to the processing unit as indicated in the block diagram of FIG. 1. Timing can be executed by the processing unit by using the real-time clock (RTC) as shown as an internal component of the processing unit in the block diagram of FIG. 1.

The rectifier bridge D1-D4 is needed since the IGBT is only conducting in one direction (transistor). It must carry the same current as the IGBT, so also a short circuit. Another solution would be to use to 'anti-parallel' IGBT's with series diodes (to carry the reverse voltage in the OFF state of the IGBT), but this would make the complete circuit more complex and expensive.

With the present state of the technology no other semiconductor solutions are possible. There are FET's with a very low channel-resistance, but these are not available as both high voltage/high current type. Triac's and thyristors cannot be used since they are only able to turn off in the zero crossing and this takes too much time. In case of short circuit they cannot be easily forced to switch off and will blow up finally.

GTO's (gate turn off thyristor) and IGCT (integrated gate-commutated thyristor) need a lot of energy to keep them in the ON state and to turn OFF. Also the driver circuit would be much more complex.

The processing unit is arranged to accommodate the measurement inputs, calculation software and output signal logic and drivers. Most time critical processes can be realized by an EPLD or logic ports, but most of the functionality can be integrated in a μP (microprocessor). Primary functions which are included in the processing unit, and which are explained in more detail below where necessary are:

Mains voltage measurement (via the Power Supply & Voltage Measurement block).
Mains current measurement & calculating overcurrent characteristic (for replacing the bimetal overcurrent protection).
Mains voltage & current synchronization.
Temperature measurement for different components in the MCB (e.g. IGBT and shunt resistor R1).
Driver logic for the relay drivers (including energy monitor of the storage capacitors).
Communication to the IGBT driver unit, user interface and communication interface.
Programming/preset interface for programming (over) current characteristics and a calibration procedure.
Internal storage of data in case of power interruptions (e.g. contact status, mains current history for the overcurrent protection), using e.g. a non-volatile memory NVM).

The current measurement is done by a shunt. In an embodiment, the current measurement unit comprises a shunt resistor R1 in the life line and a short circuit and an overcurrent detection unit arranged to measure the voltage across the shunt resistor R1. A shunt is the most logic choice for this application since the accuracy and linearity is superior to other components. Also the size is small and price/availability is reasonable. An alternative would be a Rogowski coil which is also accurate over a wide range and in high current applications. The disadvantage is that a Rogowski coil is much bigger and the output signal is much lower which makes an integrated/combined design for short circuit protection and (small) current/energy measurement more difficult. The value of the shunt resistor R1 must be chosen such that at nominal load current there is a low dissipation, e.g. 45 A/100μΩ ⇒ 0.2 W. The shunt resistor R1 must be capable to withstand the short circuit current for a short time, e.g. 1.5 kA/100μΩ/1.5 ms⇒ 225 W/0.34 Joule.

The short circuit and overcurrent detection may be implemented using an analog or digital circuit which must be fast enough to detect the short circuit. It also must be accurate enough to sense small load currents for energy measurement purposes. A logical solution is an opamp circuit or integrated (analog ASIC) circuit, but also digital circuits with a high sampling rate are possible.

The alternating current circuit breaker of a further embodiment further comprises an IGBT driver unit connected to the processing unit and a control input of the isolated gate bipolar transistor, wherein the IGBT driver unit is arranged to switch off the isolated gate bipolar transistor in a two-stage process. The IGBT driver unit may further be arranged to monitor the voltage across the IGBT.

The second galvanic separation circuit (Galvanic Separation 2 in the embodiment shown in FIG. 1) comprise one or more optocouplers for communication between the processing and IGBT driver unit. Also a small galvanic separated SMPS may be provided inside the IGBT driver unit to supply the IGBT driver circuit since this driver circuit is on another voltage potential than the other circuit parts of the circuit breaker.

The IGBT driver unit contains the following functions (possibly as separate circuits):
Two step output driver of the IGBT
Voltage (de-saturation) monitor of the IGBT collector-emitter voltage Bypass switch status monitor IGBT driver monitor IGBT ON/OFF input For turning off the IGBT in case of a short circuit disconnection, the IGBT driver unit will decrease the gate voltage of the IGBT in two steps. This action avoids both dangerous overvoltage across the IGBT, and SOA problems, especially at short circuit turn-off. The turn-off delay is about 1 µs; in this time the voltage level of the gate will be about half the normal on-voltage.

The bypass switch status monitor function detects whether the bypass switch SW1 is closed; this is done by checking the voltage across the IGBT. The status information of SW1 is forwarded to the processing unit, and can then be used for the delayed turn-off command for the IGBT in case of a short circuit.

The IGBT driver monitor checks power supply voltage of the driver circuit, this is forwarded to the processing unit. If this voltage is too low the IGBT will be in the off-state and this is a fail situation in normal operation.

The IGBT ON/OFF input receives the ON/OFF command from the processing unit.

In a further embodiment, the alternating current circuit breaker further comprises a user interface connected to the processing unit. The user interface e.g. comprises a test switch SW4 and a status indicator. The user interface is e.g. only a push button or a toggle switch with some LEDs to signal the status of the MCB (Powered/ON/OFF/failure etc.).

Furthermore, the alternating current circuit breaker may comprise a communication interface connected to the processing unit, allowing remote operation and monitoring. The communication interface is used to send all possible data to any medium (e.g. bus-system, internet or RS485), wired or wireless (RF/IR).

Note that the configuration from the diagram shown in FIG. 1 and described herein is a 1 pole+N configuration (only overcurrent and short circuit protection in the phase). If a 2 pole device is needed a second bypass switch, overvoltage protection, rectifier bridge, IGBT and IGBT driver are included in a further embodiment. Also more complex configurations of the mains supply with multiple poles (e.g. 3 phase, 3 phase+neutral, or even 4 phase) can be accommodated by further embodiments with associated additional components.

Furthermore, also direct current applications could be envisaged using the circuit breaker as described, wherein the live and neutral lines would then be the positive and negative, or positive and ground lines. In that case, further modifications may be needed to make the circuit breaker suitable for direct current use, e.g. by modifying the power supply & voltage measurement block of the embodiment shown in FIG. 1. Also the programming of the switching characteristic of the selective circuit breaker will be specifically adapted for direct current applications.

Figure 2:
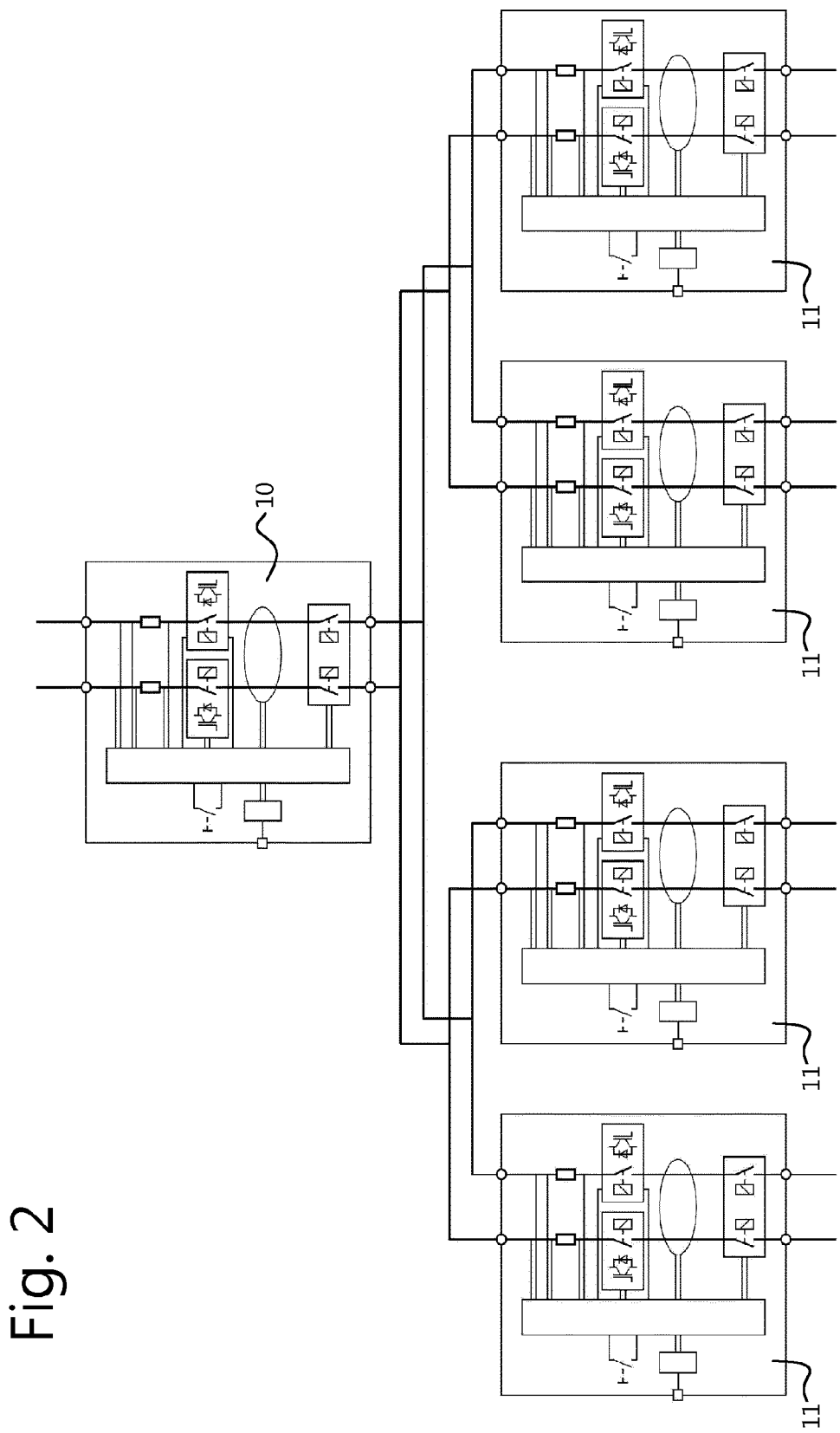
FIG. 2 shows a schematic view of an application of a selective circuit breaker in combination with a number of downstream circuit breakers.

FIG. 2 shows a block schedule of a selective hierarchy structure wherein a selective circuit breaker 10, is connected between a mains supply line and one or more, in this case four, downstream circuit breakers 11. Each downstream circuit breaker 11 (or branch device) protects one or more loads connected thereto on the downstream side. The selective circuit breaker 10 comprises a bypass switch SW1 in a supply line, and a controlled semiconductor switch IGBT connected in parallel to the bypass switch SW1, as described above with reference to FIG. 1. Furthermore, bypass switch off detection circuitry and a short circuit detection circuitry are provided for controlling the bypass switch SW1 and the semiconductor switch IGBT in accordance with a switching characteristic. The switching characteristic of the selective circuit breaker 10 is programmable, and e.g. depending on the possible/actual behavior of the downstream circuit breakers 11. A short circuit current rating of the selective circuit breaker 10 is substantially equal to a short circuit current rating of the downstream circuit breaker 11.

It is noted that in the embodiments shown in FIG. 2, the selective circuit breaker 10 and the downstream circuit breakers 11 are similar in structure and functionality. In other words, the selective circuit breaker comprises the same components as the downstream circuit breaker, i.e. they are of equal design, have the same parts and same functional characteristics. Using the processing unit, however, the switching characteristic of each circuit breaker 10, 11 can be adapted.

In addition to the elements present in the example described with reference to FIG. 1, the alternative embodiments in FIG. 2 are also provided with a bypass switch, parallel semiconductor switch and associated circuitry (hybrid switch) in the neutral line, as well as a shunt resistance in the neutral line for directly measuring the current in the neutral line.

In general, the present invention embodiments relate to a selective circuit breaker 10 (miniature circuit breaker MCB, molded case circuit breaker MCCB, or residual current device RCD) which has a selective overcurrent protection characteristic with the downstream (branch) MCB 11. The MCB/RCD 10 has a long life and many short circuit/overcurrent disconnections capability. The characteristic is fully programmable. The proposed selective MCB/RCD 10 can also be used in combination with conventional MCB/RCD's or fuses.

The selective MCB/RCD 10 has exactly the same hierarchy as a normal downstream (or branch) MCB/RCD 11, but it behaves different because it has different preprogrammed settings (i.e. switching characteristic). Because the selective MCB/RCD is made by programming a standardized product the customer is flexible in changing the parameters to obtain an optimized installation. Significant advantage is that the let through energy of the selective type MCB/RCD 10 in short circuit situations is much lower than in conventional solutions which has the advantage that the distribution network is less stressed.

Conventional selective MCB's need to carry (not break) the short circuit current of the downstream MCB. In normal short circuit situations this upstream/selective MCB is not actuated since the downstream MCB will interrupt the short circuit. The upstream/selective MCB will disconnect the short circuit if this downstream MCB doesn't open for some reason or in case there is a short circuit in the wiring between the upstream and downstream MCB. The selective MCB is then used as backup protection of the downstream MCB.

Problem with the conventional upstream selective MCB is that it must be able to break a (much) higher short circuit than the downstream MCB. This means that the short circuit rating must be chosen higher than the downstream MCB. A conventional selective MCB thus has a special construction including heavy contacts, bigger arc chamber and delayed triggering mechanism of the (mechanical) contact. This makes conventional selective MCB's expensive, and therefore often basis fuses are used.

By the nature and system hierarchy of the present invention selective MCB 10 there is no need for a special construction, and so these disadvantages are solved. For the same reason also the selective RCD functionality can be easily incorporated.

Figure 3:
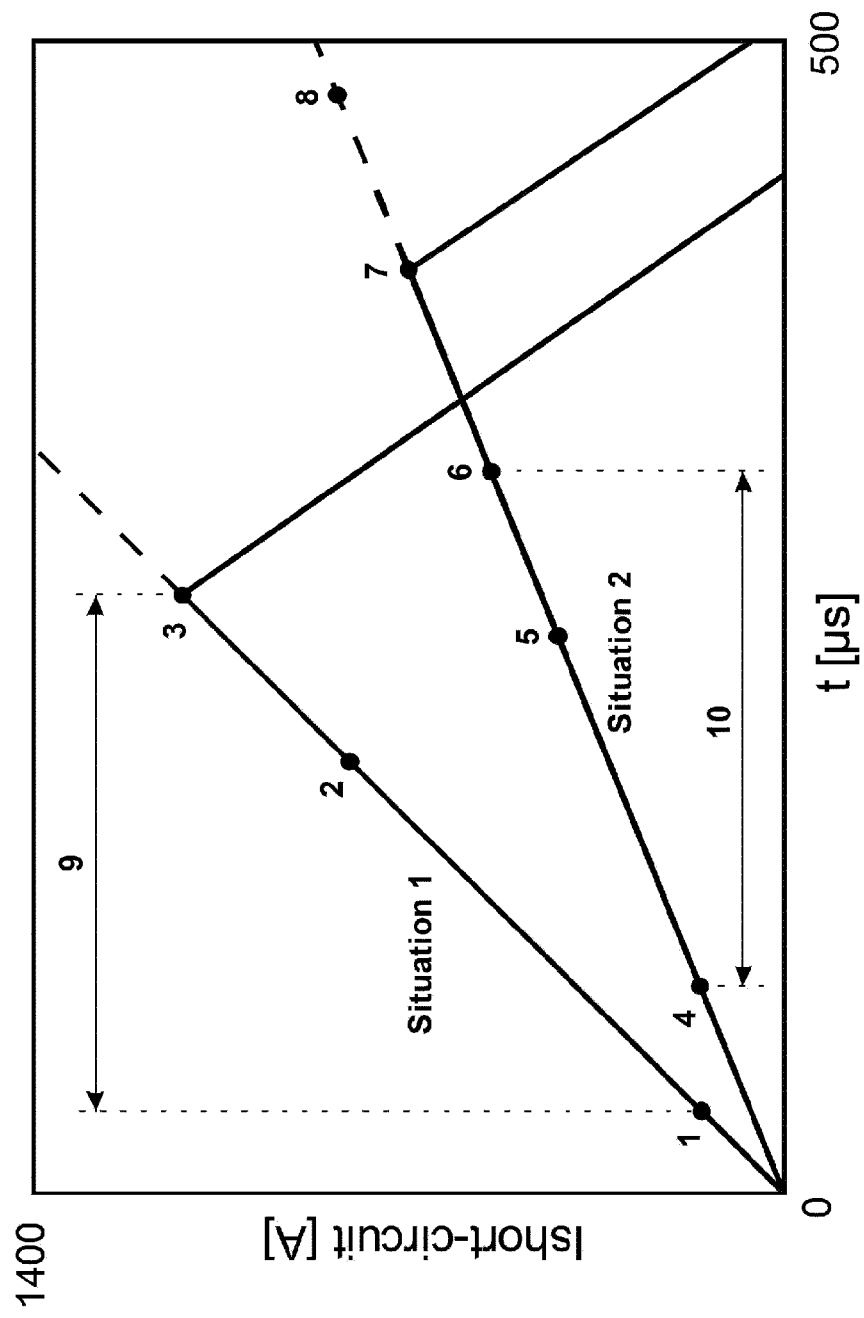
FIG. 3 shows a short circuit current versus time diagram, with two possible situations for the circuit of FIG. 2.

In FIG. 3 a graph is shown of a short circuit current as function of time, for two different situations using the present invention embodiments, i.e. a worst case system limit selectivity operating mode and a normal selectivity operating mode. In general terms, the selective circuit breaker 10 is operable in a normal operating mode or in a system limit selectivity mode, wherein in the normal operating mode the selective circuit breaker 10 is arranged (e.g. by programming) to disconnect later than the downstream circuit breaker 11, and wherein in the system limit selectivity mode the selective circuit breaker 10 is arranged (e.g. by programming) to apply a reconnect attempt.

In the worst case system limit selectivity operating mode both the selective circuit breaker 10 and branch circuit breaker 11 have an equal prospective short circuit capability, e.g. 10 kA, which is the maximum allowable short circuit capability of an MCB design. The test circumstances are worst case, so max. 10 kA rms with a starting angle at 90° of the short circuit. Both MCB's 10, 11 are in the ON position and the short circuit occurs in normal steady operation. In the normal operation mode the bypass switches SW1 are closed. This situation is reflected in the upper line of FIG. 3:

At t=0 the short circuit occurs at 90°; then the following points can be described:
1. At this moment both MCB's 10, 11 detect independently a significant over current and decide to open their bypass switches SW1. The IGBT parallel circuit is always normally ON (conducting).
2. At this moment the bypass switches SW1 of both MCB's 10, 11 open the contacts; the short circuit current will be taken over/commutated by/to the IGBT's. Somewhere around or before this time point both MCB's 10, 11 also decide that the short circuit is that serious that it must be disconnected (decision based on $I^2t$, i.e. a measure of energy). At this moment however there is not yet enough contact distance of the bypass switches SW1 so the IGBT's of both MCB's 10, 11 will wait for the contact opening delay time.
3. At this moment there is sufficient contact opening of the bypass switch SW1 and one MCB's 10 will disconnect the short circuit by opening the IGBT (normal short circuit disconnection sequence). Because both MCB's 10, 11 (in this embodiment) have no inter-communication the timing is never exactly coordinated; there is always one the fastest. After the first MCB 10 disconnects the short circuit the other MCB 11 also will follow soon and also disconnects the load. After moment 3, the remaining short circuit energy in the load will be absorbed by a varistor also connected in parallel to the bypass switch SW1 and the current will be decreased to 0A.

After this situation both MCB's 10, 11 have disconnected their load side, the branch MCB 11 will also disconnect the galvanic separation switches SW2, SW3 (see FIG. 1). There is no situation possible where the selective MCB 10 does disconnect and the branch MCB 11 does not disconnect since the decision moment for opening of both MCB's 10, 11 was taken before the fastest MCB 10 did disconnect the short circuit.

The next step is that the selective MCB 10 is programmed that way that it will try to reclose on the next zero-crossing of the main-voltage. This reclosing will start by closing the IGBT again and measuring the load current. If this is still too high it will open the IGBT again. Because the bypass switch SW1 was not yet closed this second reopening will be much faster and with a much lower let through energy $I^2t$. If the short circuit is disconnected by the branch MCB 11 the selective MCB 10 can reclose again within a period that other branch MCB's 11 and loads will not notice the voltage interruption. Or in more general wording, in the system limit selectivity mode the selective circuit breaker 10 is programmed to execute a reclosing attempt in a next zero-crossing of the mains supply after a switch off of the selective circuit breaker 10.

This worst case system limit selectivity operating mode is often not reached in practice. In case of some meters wiring between selective circuit breaker 10 and branch circuit breaker 11 a short circuit current after the branch MCB will be low because of the loop impedance. The selective circuit breaker 10 however must still be able to disconnect a short circuit directly at the distribution panel load lines, which can be above mentioned worst case short circuit current.

In the normal selectivity operating mode only the branch circuit breaker 11 will open and disconnect the short circuit. The selective circuit breaker 10 will stay closed. This situation can therefore be compared with existing selective overcurrent protection solutions. In this mode both of the circuit breakers 10, 11 have an equal or different prospective short circuit capability (the branch circuit breaker 11 has always the same or a lower short circuit rating). The test circumstances are not worst case, so e.g. a 10 kA rms short circuit with a starting angle at 30° of the short circuit. In not worst case situations the dI/dt parameter is lower than in the worst case selectivity mode, so the timing is less critical and the bypass switch SW1 is not the time critical factor anymore.

Both the selective and downstream circuit breakers 10, 11 are in the ON position and the short circuit occurs in normal steady operation. In the normal operation mode the bypass switches SW1 are closed. This situation 2 is reflected in the lower line of FIG. 3.

At t=0 the short circuit occurs at e.g. 30°; then the following points can be described:
1. At this moment both MCB's 10, 11 detect independently a significant over current and decide to open their bypass switches SW3. The IGBT parallel circuit is always normally ON (conducting). In case of a branch MCB 11 with a lower short circuit rating it is also possible that it will detect the significant over current in an earlier stage and already opens its bypass switches SW3.
2. At this moment the bypass switches SW3 of both MCB's 10, 11 open the contacts; the short circuit current will be taken over/commutated by/to the IGBT's. In case of a branch MCB 11 with a lower short circuit rating it is also possible that these contacts will already open in an earlier stage.
3. At this point the bypass switches SW1 of both MCB's 10, 11 have enough contact distance and both MCB's 10, 11 are ready to switch OFF the short circuit current by opening the IGBT's. This is however not yet done because the predetermined $I^2t$ value is not yet reached for the selective and branch MCB 10, 11. In case of a branch MCB 11 with a lower short circuit rating it is also possible that this moment 6 will be reached in an earlier stage.
4. Based on the $I^2t$ setting of the branch MCB 11 this will disconnect the short circuit by opening the IGBT. This $I^2t$ setting is lower than the selective MCB 10 $I^2t$ setting which is set at e.g. the maximum allowable value for the circuit design.
5. At this point the selective MCB 10 would have reached its $I^2t$ setting, but the short circuit is already disconnected by the branch MCB 10. After some time the selective MCB 10 will close the bypass switches SW1 again.

Note that both selective and branch MCB's 10, 11 can have the same prospective short circuit rating, but a different $I^2t$ disconnection setting. Branch MCB's 11 with a lower prospective short circuit rating have normally a lower $I^2t$ setting. The $I^2t$ detection in general can be made very accurate by electronic detection.

The periods 9 and 10 as shown in FIG. 3 are equal for both selective and branch MCB 10, 11. This is the time delay for opening of the bypass switch SW1, including sufficient contact distance, which is a constant value. This total opening time of the bypass switch SW1 (electrical+mechanical+contact opening distance delay) is the mayor factor for the prospective short circuit disconnection rating.

Note that the change from "worst case system limit selectivity mode" to "normal selectivity operating mode" is done automatically and controlled by the operation algorithm of both the selective circuit breaker and downstream circuit breaker 10, 11 independently. If the dI/dt slope of the short circuit is more and more slow, there will be a situation where there is no need to disconnect the short circuit for the selective MCB 10 since it the branch MCB 11 already disconnected and the selective MCB 10 is still below maximum worst case system limits. Thus in other words, the selective circuit breaker 10 is arranged to select the normal selectivity or the system limit selectivity operating mode based on a dI/dt measurement in the main supply line.

To have a reliable value of the energy which is involved by a short circuit disconnection the $I^2t$ value is often used as a parameter. Energy is normally $E=U*I*t$; so also $E=I*R*I*t$; so also $E=I^2*R*t$. Since in case of a fuse or breaker the R is low and constant this is ignored and so the energy may be assumed linear with the $I^2t$ value.

An $I^2t$ detection can be made by an electronic circuit containing a multiplier ($I*I=I^2$) and an integrator network which integrates the $I^2$ value over the time.

Figure 4:
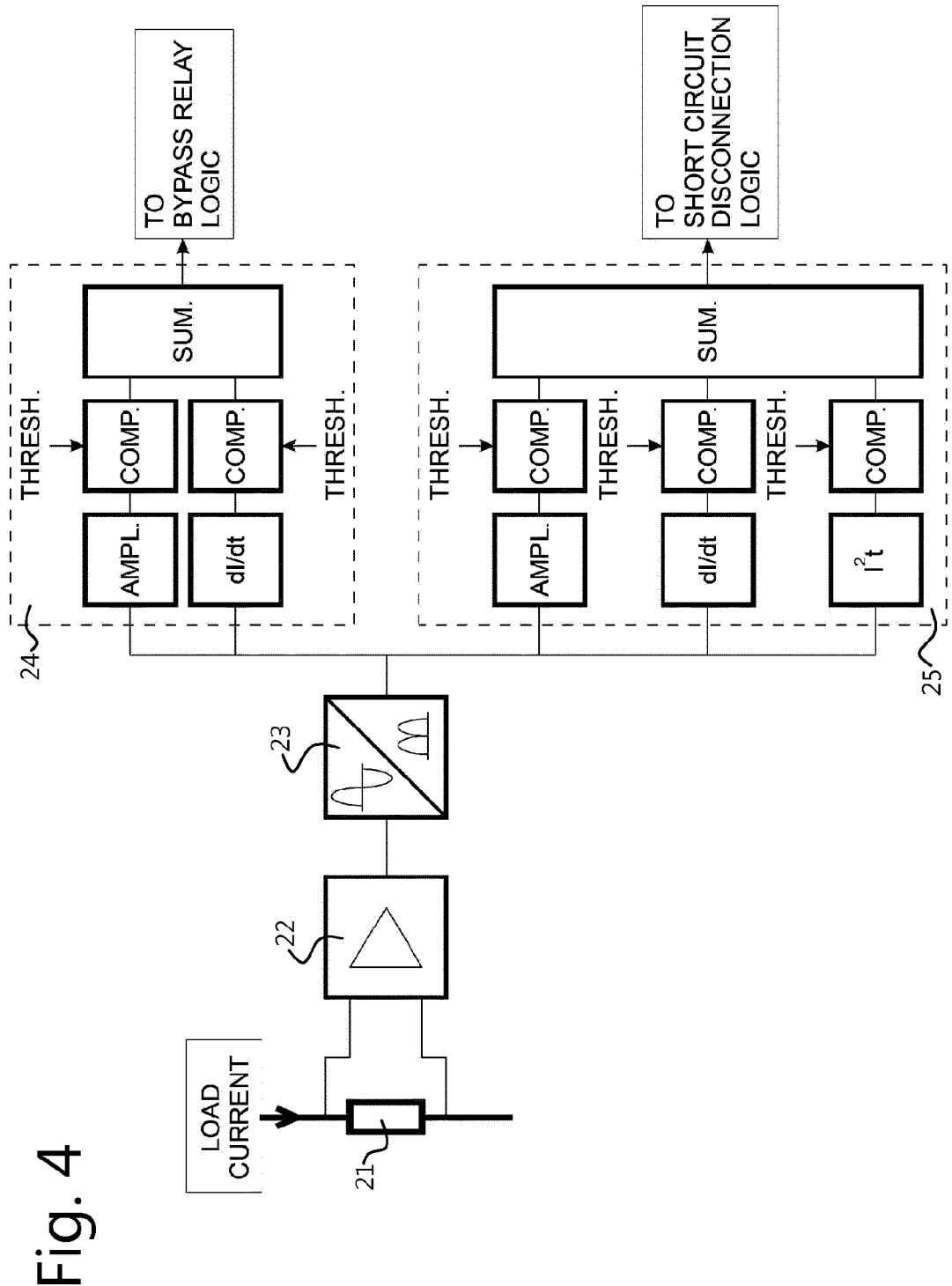
FIG. 4 shows a partial schematic block diagram for measurement of parameters in the circuit breaker of FIG. 1.

In FIG. 4 a possible block diagram is displayed were the detection moment of the bypass switch OFF detection (points 1 and 4 from FIG. 3) and the short circuit disconnection detection (described under point 2 of the worst case system limit selectivity operating mode and points 7 and 8 of the normal selectivity operating mode) is determined. The load current is measured using a shunt impedance 21 (see also FIG. 1), across which an amplifier 22 is connected. The output of the amplifier 22 is rectified (in case of an alternating current on the live line) by rectifier 23. This signal is then led to input of a bypass switch off detection block 24 and a short current circuit detection block 25. Inside these (functional) blocks, the signal is compared with threshold levels for amplitude, change over time (dI/dt), and/or energy ($I^2t$), and depending on the specific implementation/programming of the circuit breaker 10, 11, summed to provide an output signal. By this principle it is free to choose the most optimum combination of amplitude, dI/dt and $I^2t$ values for detecting the short circuit. The "bypass switch off detection" block 24 and "short circuit detection" block 25 are part of the "short circuit & overcurrent detection" block of FIG. 1. The outputs are connected to the processing block of FIG. 1. In general terms, the switching characteristic of the selective circuit breaker 10 (and possibly also of the downstream circuit breaker 11) is based on measurement of an energy parameter ($I^2t$ driven), measurement of current amplitude, and/or change of current over time (dI/dt).

The above described procedure is applicable for the short circuit situation. The coordination between selective circuit breaker 10 and downstream or branch circuit breaker 11 is more time critical than at normal overload situation. In overload situations it must also been guaranteed that the branch circuit breaker 11 always will disconnect earlier. Especially when two circuit breakers of similar design (see FIG. 1 and FIG. 2) are applied as selective circuit breaker 10 and branch circuit breaker 11 the difference in overload setting between the selective circuit breaker 10 and branch circuit breaker 11 can be kept low. By principle (accurate current measurement and software rms calculation of overload) the tolerances are much smaller than when using the prior art bimetal solutions.

The selectivity for overcurrents between selective circuit breaker 10 and branch circuit breaker 11 are guaranteed by choosing at least a small but proper distance between the nominal current values of the two circuit breakers 10, 11. This can be easily programmed by the nominal current value and the overload characteristic of both circuit breakers 10, 11.

Note that in networks with more than one branch circuit breaker 11 there is always a difference between the nominal current values of the selective circuit breaker 10 and branch circuit breaker 11. However the nominal currents of branch circuit breakers 11 are often not added to retrieve the selective current because of the 'simultaneously factor'. Not all branches are fully loaded, so often the total power of the branch circuit breakers 11 is added and multiplied by e.g. 0.6 to retrieve the selective circuit breaker 10 power rating.

Time frames of disconnecting overloads are long, so the time delay of bypass switch SW1 opening is not an issue. Note that in case of power interruptions or temporary OFF situations the present invention circuit breakers 10, 11 can store the overload history data in a NVM (Non Volatile Memory), and by a RTC (Real Time Clock) it will take the overload history data into account again after power ON.

Because the power ON procedure for the (Smart) circuit breaker 10, 11 is different from regular, prior art circuit breakers, the behavior of disconnecting short circuits or overloads at power ON or after mains interruptions is also different.

Both selective and downstream circuit breakers 10, 11 are fully open (galvanic separated) in unpowered situations. The internal power supply is connected at the line side of the breaker (see FIG. 1) and thus able to energize the processing block before connecting the load. In practice the power up time of the Smart circuit breaker is e.g. 500 ms. At power up (for the first time or after a power interruption) first the selective circuit breaker 10 will be powered and switched ON. If there is no short circuit after another 500 ms also the branch circuit breaker 11 will switch ON its load.

If directly after switching ON the selective circuit breaker 10 a short circuit between selective circuit breaker 10 and branch circuit breaker 11 is detected the selective circuit breaker 10 will switch OFF immediately again according the normal short circuit disconnection procedure. If directly after switching ON the branch circuit breaker 11 a short circuit after the branch circuit breaker 11 is detected, the disconnection coordination is according the above mentioned situations 1 and 2.

A manual or by remote control switched ON branch circuit breaker 11 will not close its contacts before it is supplied and fully operational, so if the selective circuit breaker 10 is in the OFF state it is not possible to force the branch circuit breaker 11 to ON.

The Smart circuit breaker hierarchy is also able to have a correct coordination with other types of breakers or fuses, i.e. the downstream circuit breaker may be a conventional type circuit breaker, such as a fuse, an automatic circuit breaker, etc. If the selective circuit breaker 10 is of the type as discussed in the embodiments of the present invention, the $I^2t$ parameter of the downstream conventional branch circuit breaker or fuse must be lower to guarantee the correct coordination. In general however the $I^2t$ of conventional MCB's and fuses are much higher as they are slow in interrupting a short circuit current. This slow disconnection behavior stresses cables and supply network. Also for detecting overload situations conventional circuit breakers and fuses are relative inaccurate, so a bigger distance between the overload setting of the selective circuit breaker 10 and conventional circuit breaker or fuse must be chosen.

In a further embodiment, also a faultcurrent detection function is provided. In conventional selective MCB's there is often no earthfault detection function provided, this would be an additional device. For the present invention selective and downstream circuit breakers 10, 11 it is however very easy to also include the earthfault functionality by hierarchy, with or without selectivity. This product would be a 'Smart MCB/RCD (Combined MCB and RCD or Residual Current Circuit breaker with Overcurrent protection, RCBO)'.

If the earthfault selectivity must be guaranteed between selective and branch RCD in state of the art solutions there is always a difference in the nominal earthfault sensitivity IΔn. If the branch RCD has an IΔn of 30 mA, the selective RCD will be 100 mA or 300 mA. Beside of this the selective RCD also needs a non-actuating time which is longer than the actuating time of the standard RCD. Because a conventional selective type RCD has another operating characteristic and may not be used in all situations, they have a different type marking "S-type".

Of course by the hierarchy of the present invention Smart MCB/RCD 10, 11 this standardized "S-type" can be fully integrated in the selective version, but there are also other more possibilities.

Similar to the short circuit disconnection philosophy both selective and downstream RCD's 10, 11 could have the same rating, e.g. IΔn=30 mA, type general. The selective RCD 10 however trips at a higher faultcurrent than the branch RCD 11; e.g. the branch RCD 11 trips at 20 mA and the selective RCD 10 trips at 25 mA. Also the time delay of the selective RCD 10 can be made slightly longer than the time delay of the branch RCD 11 (but within the limits of the standards). In this case it is guaranteed that there is no situation possible were the selective RCD 10 does disconnect and the branch RCD 11 does not disconnect. The faultcurrent detection in general can be made very accurate by an electronic detection as used in the 'Smart MCB/RCD' described already above. In general, the selective circuit breaker 10 has an earth fault sensitivity substantially similar to an earth fault rating of the downstream circuit breaker 11, and a current threshold higher than a current threshold of the downstream circuit breaker 11. Furthermore, the selective circuit breaker 10 may have an earth fault time delay which is longer than an earth fault time delay of the downstream circuit breaker 11.

In rare cases that the selective RCD 10 nevertheless switches OFF it is also possible that it is programmed so that it will try to reconnect after some period with a preprogrammed number of trials. If the earthfault still exists it will switch OFF directly again within the time limits of the standards. This should not be forbidden by any standard since it is also possible to reconnect manually (by the operation toggle). Note that in case of an existing steady faultcurrent in another branch RCD 11 the selectivity difference method is not functioning anymore. In this case however a number of measures can be taken e.g. alarming this existing steady faultcurrent to an service engineer or (temporary) automatically increasing the selectivity difference. In case of an existing steady capacitive earthfault it is also possible to ignore this by recognition of the phase difference.

Because the present invention Smart MCB/RCD 10, 11 has communication means (Communication interface, see FIG. 1) it is possible that they have continuously contact about the earthleakage status. If a branch RCD 11 notices a steady faultcurrent (and phase angle), this can be communicated to the selective RCD 10. The selective RCD 10 collects all the data and compares it with the own measured faultcurrent. By this comparison the Smart RCD 10 can calculate whether the measured faultcurrent is coming from one or more branch RCD's 11 or is caused somewhere at the wiring in between the branch RCD's 11 and the selective RCD 10. In fact the branch RCD should only disconnect this latter faultcurrent.

In general, the selective circuit breaker may be arranged to detect whether an earth fault and/or a short circuit fault is present in the wiring between the selective circuit breaker 10 and the downstream circuit breaker 11.

The selective circuit breaker 11 can be programmed to not open at all, but only report faultcurrents by the communication port to a service engineer. In some cases a power disconnection can be more dangerous or costly than accepting (temporary) the faultcurrent. This possibility is especially advantageous when according to the standards no selective or backup RCD must be used, but the service engineer receives constant quality information about the distribution network "healthiness".

The present invention embodiments may also be used to implement an adaptive short circuit characteristic of the selective circuit breaker 10, i.e. to program the switching off characteristics for short circuits during operation depending on the power source used to feed in via the supply line. The selective circuit breaker 10 is arranged to change the switching characteristics depending on a mains supply source connected to the selective circuit breaker. The mains supply source may be a transformer (as normally used), an uninterrupted power supply UPS, a generator, etc. This can be particularly advantageous in e.g. data centers where an uninterrupted power supply of all racks and servers is very important. In such cases usually the normal supply from the utility mains is used (supply via a transformer), and an UPS (static or rotating), and a generator. A short circuit protection is provided at multiple levels, it is important that for every such type of power supply selectivity in view of downstream circuit breakers 11 is guaranteed. In a normal transformer fed utility power supply a much higher short circuit current may occur than in the case of an UPS (e.g. battery based) or generator, and when switching, selectivity may not be guaranteed: If the switch off characteristic of a circuit breaker for a rack is aimed at the utility power supply, this circuit breaker will respond slower when switching over to an UPS or generator in case of a short circuit, as the short circuit current will be lower. As a result, a short circuit will be present for a longer time period, and the rack will be without power supply longer posing a bigger threat to continuity of servers in the rack (sometimes the servers can only last 10-20 ms without power supply). In a present invention embodiment, the switching over from a utility power supply to an UPS can be signaled to the selective circuit breaker 10, allowing a change in the short circuit characteristic of the circuit breaker 10 to an optimum setting for the actually used power supply. Also for other situations (e.g. supply from a renewable energy source, such as solar power or wind power) optimum short circuit characteristics may be (automatically) selected.

Such (automatic) adaptation of short circuit characteristics of the selective circuit breaker can also be advantageous in further situations. E.g. the network and loads protected by the selective circuit breaker 10 and branch circuit breakers 11 may be analyzed and the short circuit characteristics adapted accordingly. Usually big differences may occur in potential short circuit power, the source impedance and cable length from the medium voltage transformer are factors therein. Usually a much higher potential short circuit power is chosen than absolutely necessary, however this results in the fact that the energy released in a short circuit situation in unnecessarily high (fire hazard), and the utility supply interruption as a consequence too long. Measurement apparatus may be available allowing on site measurement of the (potential) short circuit power, and using such measurement the selective circuit breaker 10 may be properly programmed. The measurement apparatus may even be directly coupled to the communication interface, allowing automatic adaptation during operation. In general terms, the selective circuit breaker may be arranged to measure short circuit power on site during operation, and to change the switching characteristics accordingly, possibly automatic.

In a further embodiment, the selective circuit breaker has further advantages in the field of safety, specifically when service personnel is required to work in an enclosure (room) with electrical equipment. Upon detection of persons in the vicinity of the equipment (e.g. when entering the enclosure), the switch off characteristic of the selective circuit breaker is adapted to a lower current level. The potential energy released in case of an actual short circuit situation is then lowered, raising the safety level. In general wording, the selective circuit breaker is further arranged to change a switch-off characteristic dependent on a detection of presence of persons.

The present invention embodiments provide several advantages and benefits over prior art examples of selective circuit breakers:

Optimized protection (very low let-through energy/$I^2t$) of wiring between selective and branch MCB 10, 11 with very small difference of $I^2t$ between selective and branch MCB's 10, 11.

Optimized earthfault protection between selective and branch RCD with small faultcurrent sensitivity difference of selective and branch RCD's.

Very short interruption-time of the power line between selective MCB/RCD and branch MCB/RCD's where other loads do not notice the interruption time. Reclosing of the selective MCB by preset parameter.

Standardized (equal) design of selective and branch MCB/RCD's; custom/field programmable selectivity functionality.

Integrated and programmable MCB/RCD characteristics; each individual device can be programmed as MCB selective and/or RCD selective.

Combine the selective MCB functionality with a selective RCD functionality.

Communication system for service engineer and between Smart MCB/RCD's. Selective RCD is able to collect branch RCD steady faultcurrent information and by comparing it to its own measurement it can recognize were the fault is situated (after the branch RCD or between branch and selective RCD). By this information the selective RCD can determine whether it must disconnect or ignore the fault current.

The present invention embodiments have been described above with reference to a number of exemplary embodiments as shown in the drawings. Modifications and alternative implementations of some parts or elements are possible, and are included in the scope of protection as defined in the appended claims.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

The invention claimed is:

1. A selective circuit breaker, in operation connectable between a main supply line and a downstream circuit breaker, the selective circuit breaker comprising:
a bypass switch in a supply line;
a controlled semiconductor switch connected in parallel to the bypass switch;
a bypass switch off detection circuitry; and
a short circuit detection circuitry configured to control the bypass switch and the controlled semiconductor switch in accordance with a switching characteristic,
wherein the switching characteristic is programmable,
wherein a short circuit current rating of the selective circuit breaker is substantially equal to a short circuit current rating of a downstream circuit breaker,
wherein the selective circuit breaker is operable in a normal operating mode or in a system limit selectivity mode,
wherein in the normal operating mode the selective circuit breaker is programmed to disconnect later than the downstream circuit breaker, and
wherein in the system limit selectivity mode the selective circuit breaker is programmed to apply a reconnect attempt.

2. The selective circuit breaker of claim 1, comprising the same components as the downstream circuit breaker.

3. The selective circuit breaker of claim 1, configured to select the normal selectivity or the system limit selectivity operating mode based on a dI/dt measurement in the main supply line.

4. The selective circuit breaker of claim 1, wherein in the system limit selectivity mode the selective circuit breaker is programmed to execute a reclosing attempt in a next zero-crossing of the mains supply after a switch off of the selective circuit breaker.

5. The selective circuit breaker of claim 1, wherein the switching characteristic is based on measurement of an energy parameter, measurement of current amplitude, and/or change of current over time (dI/dt).

6. The selective circuit breaker of claim 1, wherein the downstream circuit breaker is a conventional type circuit breaker.

7. The selective circuit breaker of claim 1, configured to change the switching characteristics depending on a mains supply source connected to the selective circuit breaker.

8. The selective circuit breaker of claim 1, configured to measure short circuit power on site during operation, and to change the switching characteristics accordingly.

9. The selective circuit breaker of claim 1, wherein the selective circuit breaker is configured to change a switch-off characteristic dependent on a detection of presence of persons.

10. The selective circuit breaker of claim 1, having a ground fault sensitivity substantially similar to a ground fault rating of the downstream circuit breaker, and a current threshold higher than a current threshold of the downstream circuit breaker.

11. The selective circuit breaker of claim 10, having a ground fault time delay which is longer than a ground fault time delay of the downstream circuit breaker.

12. The selective circuit breaker of claim 1, configured to detect whether a short circuit fault and/or a ground fault is present in wiring between the selective circuit breaker and the downstream circuit breaker.

13. The selective circuit breaker of claim 1, further comprising:
a communication interface configured to exchange data with the downstream circuit breaker.

14. A method for controlling a circuit breaker system, the method comprising:
connecting, between a downstream circuit breaker and a main supply line, a selective circuit breaker comprising a bypass switch in a supply line, and a controlled semiconductor switch connected in parallel to the bypass switch;
providing a bypass switch off detection circuitry for detecting the status of the bypass switch and a short circuit detection circuitry for detecting a short circuit situation or an overcurrent situation;
providing a processing unit for controlling the bypass switch and the semiconductor switch in accordance with a switching characteristic,
selecting, with a processing unit:
a normal operating mode, in which the selective circuit breaker is programmed to disconnect later than the downstream circuit breaker; or
a system limit selectivity mode, in which the selective circuit breaker is programmed to apply a reconnect attempt, and
based on a dI/dt measurement in the main supply line.

15. The method according to claim 14, wherein the selective circuit breaker is connected to a plurality of downstream circuit breakers.

16. A selective circuit breaker, in operation connectable between a main supply line and a downstream circuit breaker, the selective circuit breaker comprising:
a bypass switch in a supply line;
a controlled semiconductor switch connected in parallel to the bypass switch;
a bypass switch off detection circuitry; and
a short circuit detection circuitry configured to control the bypass switch and the controlled semiconductor switch in accordance with a switching characteristic,
wherein the switching characteristic is programmable,
wherein a short circuit current rating of the selective circuit breaker is substantially equal to a short circuit current rating of a downstream circuit breaker, and
wherein the selective circuit breaker has a ground fault sensitivity substantially similar to a ground fault rating of the downstream circuit breaker, and a current threshold higher than a current threshold of the downstream circuit breaker.

17. The selective circuit breaker of claim 16, having a ground fault time delay which is longer than a ground fault time delay of the downstream circuit breaker.

* * * * *